United States Patent [19]
Mourick

[11] 4,095,151
[45] June 13, 1978

[54] CIRCUIT ARRANGEMENT FOR AN A-C SERIES MOTOR

[75] Inventor: Paul Mourick, Erlangen, Germany

[73] Assignee: Siemens Aktiengesellschaft, Berlin and Munich, Germany

[21] Appl. No.: 723,549

[22] Filed: Sep. 15, 1976

[30] Foreign Application Priority Data

Sep. 15, 1975  Germany .................. 2541113

[51] Int. Cl.² .............. H02P 3/12; H02P 3/00
[52] U.S. Cl. .................... 318/266; 318/375; 318/369
[58] Field of Search .......... 318/266, 379, 380, 381, 318/375, 369

[56] References Cited
U.S. PATENT DOCUMENTS 3,260,908  7/1966  Bostwick .................. 318/379

Primary Examiner—B. Dobeck
Assistant Examiner—Len Pojunas

[57] ABSTRACT

An a-c series motor with a switching device for changing from motor to braking operation has a series circuit consisting of a capacitor and a charging diode associated therewith, in which, in order to avoid an additional resistor for limiting the charging current for the capacitor, the capacitor and the charging diode are connected in such a manner that the armature winding is shunted by the series circuit consisting of the capacitor and the charging diode, a switch contact being arranged between the center of this series circuit and the external terminal of the field winding, so that in motor operation, a series circuit consisting of the capacitor, the charging diode and the field winding is connected between the terminals of the a-c series motor and in braking operation, the armature winding in series with the field winding is shunted by the capacitor.

1 Claim, 1 Drawing Figure

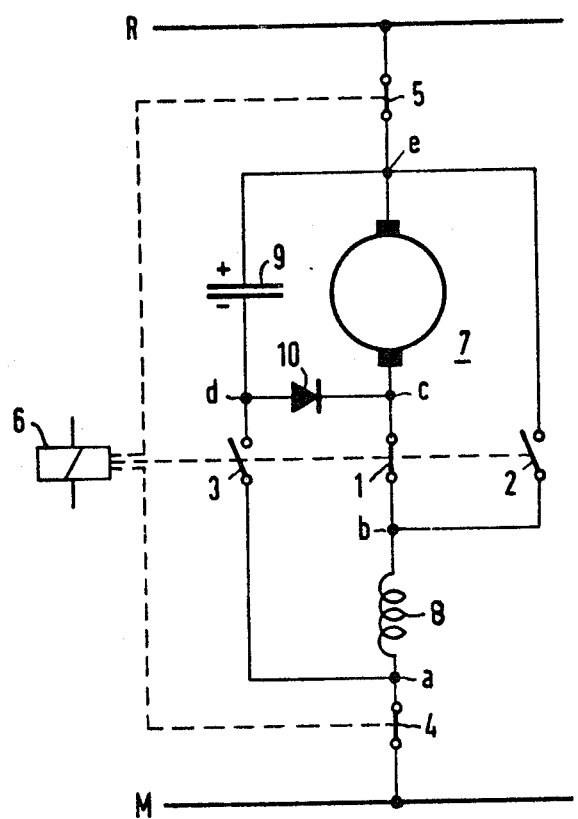

CIRCUIT ARRANGEMENT FOR AN A-C SERIES MOTOR

BACKGROUND OF THE INVENTION

The invention relates to a circuit arrangement for an a-c series motor with a switching device for changing from motor to braking operation in general and more particularly to an improved arrangement of this nature.

In a known circuit, a first switch contact is arranged between the armature winding and the field winding of the motor and a second switch contact across the series circuit consisting of the first switch contact and the armature winding, and a third switch contact across the series circuit consisting of the first switch contact and the field winding, a capacitor and a charging diode in series being associated with the a-c series motor.

In motor operation, the first switch contact is closed and the second and third switch contacts are open. When changing to braking operation, the motor is separated from the supplying a-c network and the first switch contact is opened and the second and third switch contact are closed. The armature and the field windings are thus in a closed circuit. The residual field in the field winding induces an electromotive force in the armature winding which causes a braking current to flow which decelerates the motor.

At the beginning of such a self-excited braking operation, there is not always a field with an unequivocally defined excitation. In the worst case, the electromotive force induced in the field winding is so small that no current is built up in the braking circuit and the motor cannot be braked at all. This can happen particularly if the commutator of the motor is dirty.

U.S. Pat. No. 3,673,482 describes a circuit arrangement in which a capacitor and a diode in series are connected directly between the two a-c leads during motor operation. In motor operation, the capacitor is charged from the a-c voltage via the diode. A series resistor is required for limiting the charging current for the capacitor. At the beginning of the braking operation, the field winding is externally excited for a short time by a discharge of the capacitor. The field winding is thereby excited in an unequivocally defined manner and induces an electromotive force in the armature winding which drives a sufficiently large braking current.

SUMMARY OF THE INVENTION

It is the object of the present invention to simplify this known circuit arrangement.

According to the present invention, this object is attained by shunting the armature winding with the capacitor and the charging diode in series and arranging the third switch contact between the center of this series circuit and the external terminal of the field winding, so that, in motor operation, a series circuit consisting of the capacitor, the charging diode and the field winding is connected between the terminals of the a-c series motor, and, when the switch contacts are changed over into braking operation, the series circuit consisting of the armature winding and the field winding is shunted by the capacitor.

With the circuit arrangement according to the invention, a resistor is not needed because of the special arrangement of the series circuit consisting of the capacitor and the charging diode. The limiting of the charging current for the capacitor is achieved by the inductive and ohmic resistance of the field winding.

BRIEF DESCRIPTION OF THE DRAWINGS

The single FIGURE is a circuit diagram of the circuit arrangement of the present invention.

DETAILED DESCRIPTION OF THE INVENTION

In the drawing, an a-c series motor with an armature winding 7 and a field winding 8 is shown. In motor operation, the armature winding 7 and the field winding 8 are connected in series between a phase R and ground M of an a-c network. A switching device, schematically shown as a relay coil 6 with switch contacts 1 to 5, is associated with the a-c series motor. The switch contact 1 is between the inner terminal c of the armature winding 7 and the inner terminal b of the field winding 8. The switch contact 2 bridges the series circuit consisting of the armature winding 7 and the first switch contact 1 and is therefore connected between the outer terminal e of the armature winding 7 and the inner terminal b of the field winding 8. The switch contact 3 is arranged between the outer terminal a of the field winding 8 and the center d of a series circuit consisting of a capacitor 9 and a charging diode 10. The series circuit consisting of the capacitor 9 and the charging diode 10 shunts the armature winding between the connection points c and e. The switch contacts 4 and 5 are connected into the leads to the phases R and M of the a-c network.

The position of the switch contacts 1 to 5 shown corresponds to motor operation. The capacitor 9 is charged with the polarity indicated via the charging diode 10 by the armature voltage of the motor to a voltage which is $\sqrt{2}$ times the value of the supplied a-c voltage less the voltage drop of the windings. The capacitor 9 is decoupled from the field winding 8 by the open switch contacts 2 and 3.

When switching to braking operation, the relay coil 6 switches over the contacts 1 to 5. The motor is now separated from the a-c supply network by the open switch contacts 4 and 5. The series circuit consisting of the armature winding 7 and the field winding 8 is interrupted by the open switch contact 1. The capacitor 9 is discharged through switch contacts 2 and 3 which are now closed and the field winding 8. The field winding 8 is excited with an unequivocally predetermined polarity and induces in the armature winding 7 an electromotive force which drives a sufficiently large braking current. The armature voltage induced in the armature winding 7 by the discharge of the capacitor 9 into the field winding 8 ensures the definite completion of the further self-excited braking process.

In the circuit arrangement according to the present invention, no series resistor is required for limiting the charging current for the capacitor 9. The charging current for the capacitor 9 is instead limited by the field winding 8.

A circuit arrangement according to the present invention is particularly well suited for an a-c series motor which is used as a drive motor in electric switch gear, particularly in a fast acting mechanical switch. In such a case operation from motor operation to braking operation is switched by a cam switch when the switch contacts of the fast acting switch have reached their intended end position,

What is claimed is:

1. In a circuit arrangement for an a-c series motor having an armature and a field winding with a switching device for changing from motor to braking operation comprising:
   a. a first switch contact between the armature winding and the field winding;
   b. a second switch contact across a series circuit consisting of the first switch contact and the armature winding;
   c. a third switch contact across the series circuit consisting of the first switch contact and the field winding;
   d. a capacitor and a charging diode in series associated with the a-c series motor, the improvement comprising;
   e. the series circuit consisting of the capacitor and the charging diode shunting the armature winding; and
   f. the third switch contact disposed between the center of said series circuit consisting of the capacitor and the charging diode and the external terminal of the field winding, whereby in motor operation a series circuit consisting of the capacitor, the charging diode and the field winding is connected between the terminals of the a-c series motor and, during braking operation, the field winding is shunted by the capacitor.

* * * * *